(12) United States Patent
Schoenberg

(10) Patent No.: US 9,317,441 B2
(45) Date of Patent: Apr. 19, 2016

(54) INDEXED PAGE ADDRESS TRANSLATION TO REDUCE MEMORY FOOTPRINT IN VIRTUALIZED ENVIRONMENTS

(75) Inventor: Sebastian Schoenberg, Hillsboro, OR (US)

(73) Assignee: Intel Cororation, Santa Clara, CA (US)

(*) Notice: Subject to any disclaimer, the term of this patent is extended or adjusted under 35 U.S.C. 154(b) by 278 days.

(21) Appl. No.: 13/995,126

(22) PCT Filed: Dec. 22, 2011

(86) PCT No.: PCT/US2011/067043
§ 371 (c)(1),
(2), (4) Date: Jun. 17, 2013

(87) PCT Pub. No.: WO2013/095579
PCT Pub. Date: Jun. 27, 2013

(65) Prior Publication Data
US 2014/0201421 A1    Jul. 17, 2014

(51) Int. Cl.
*G06F 12/10* (2006.01)
*G06F 9/455* (2006.01)

(52) U.S. Cl.
CPC ........ *G06F 12/1009* (2013.01); *G06F 9/45558* (2013.01); *G06F 12/1027* (2013.01); *G06F 2009/45583* (2013.01); *G06F 2212/681* (2013.01)

(58) Field of Classification Search
CPC ............ G06F 12/1009; G06F 12/1027; G06F 9/45558; G06F 2212/681; G06F 2009/45583
See application file for complete search history.

(56) References Cited

U.S. PATENT DOCUMENTS

| 6,289,432 B1* | 9/2001 | Ault .................. G06F 12/109 |
| | | 711/147 |
| 6,851,038 B1* | 2/2005 | Krolski et al. ................ 711/207 |
| 2006/0026383 A1* | 2/2006 | Dinechin et al. ............. 711/207 |
| 2006/0139360 A1 | 6/2006 | Panesar et al. |
| 2006/0206687 A1 | 9/2006 | Vega |

(Continued)

FOREIGN PATENT DOCUMENTS

| TW | 200919183 A | 5/2009 |
| TW | 201122814 A | 7/2011 |

OTHER PUBLICATIONS

International Preliminary Report on Patentability for corresponding International Application No. PCT/US2011/067043, dated Jun. 24, 2014, 5 pages.

(Continued)

*Primary Examiner* — Matthew Bradley
*Assistant Examiner* — Rocio Del Mar Perez-Velez
(74) *Attorney, Agent, or Firm* — Nicholson De Vos Webster & Elliott, LLP

(57) ABSTRACT

Embodiments of systems, apparatuses, and methods for performing guest logical memory address to host physical memory address translation are described. In some embodiments, a system receives the guest logical memory address and determines an index page reference from the guest logical memory address. The system further retrieves a page index corresponding to the virtual machine. In addition, the system retrieves a first part of the host physical memory address from index page using the page index and a second part of the host physical memory address from the guest logical memory address. The system generates the host physical memory address from the first and second parts of the host physical memory address.

18 Claims, 15 Drawing Sheets

(56) References Cited

U.S. PATENT DOCUMENTS

| | | | |
|---|---|---|---|
| 2008/0077765 A1 | 3/2008 | Illikkal | |
| 2008/0177974 A1* | 7/2008 | Chiang | G06F 12/1036 711/173 |
| 2009/0013149 A1* | 1/2009 | Uhlig et al. | 711/207 |
| 2011/0161562 A1* | 6/2011 | Chang et al. | 711/103 |

OTHER PUBLICATIONS

Search Report of R.O.C. Patent Application No. 101145910, dated Aug. 27, 2014 1 page.

PCT "Notification of Transmittal of the International Search Report and the Written Opinion of the International Searching Authority, or the Declaration", Application No. PCT/US2011/067043 mailed Jul. 31, 2012, 8 pages.

* cited by examiner

GUEST LOGICAL MEMORY ADDRESS 200

| 202A | 202B | 202C | 202D |

FIGURE 2

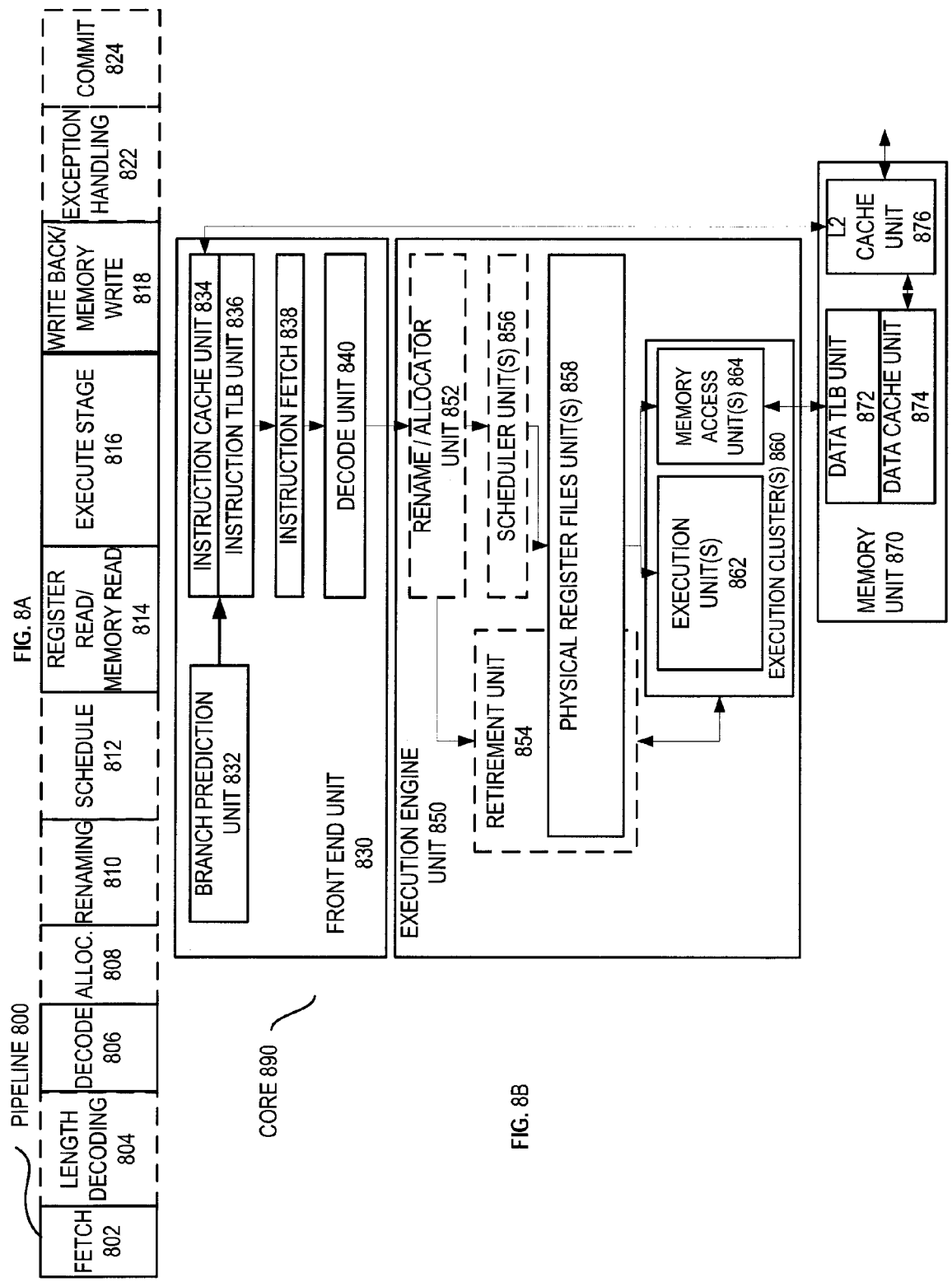

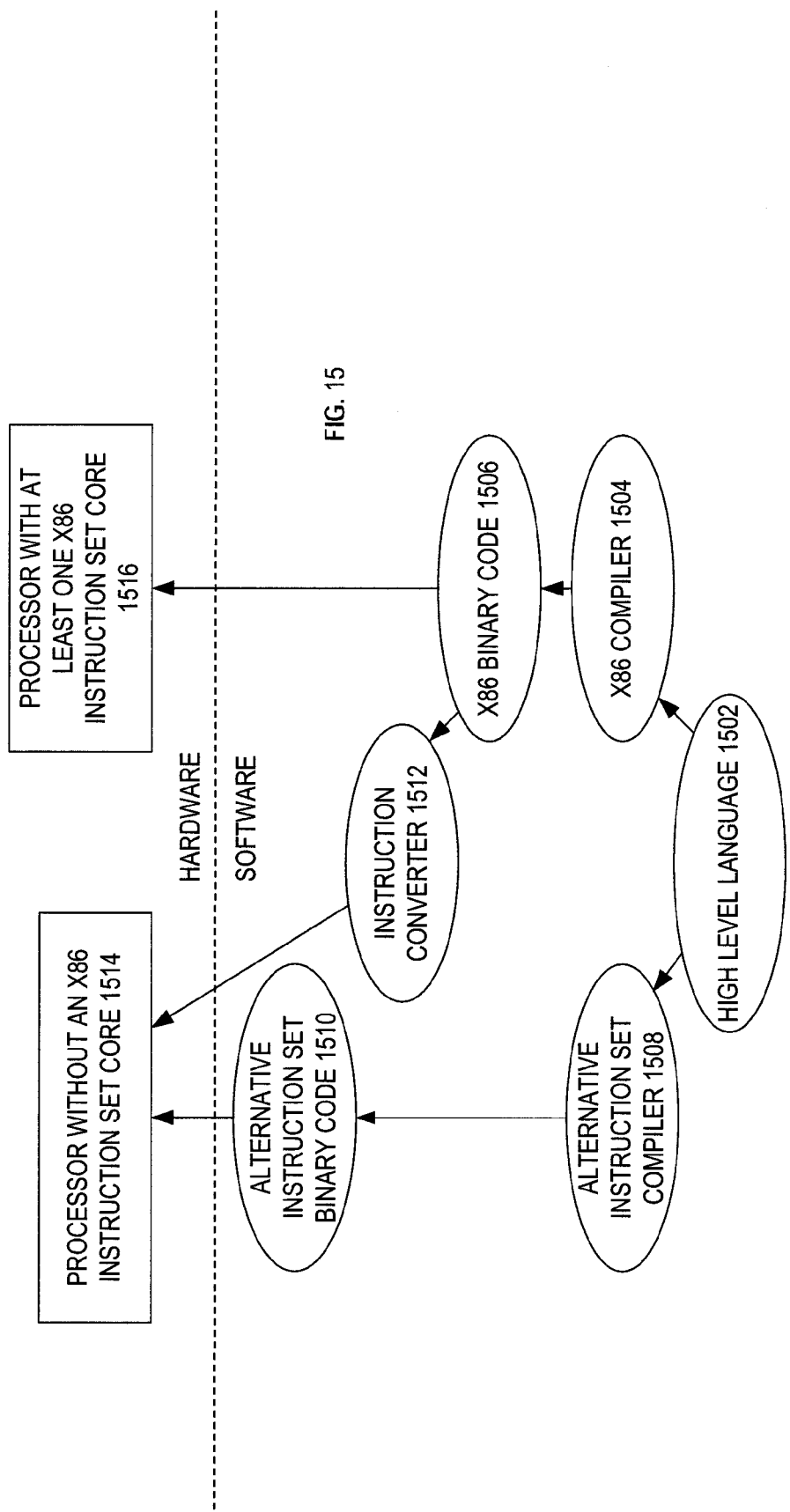

INDEXED PAGE ADDRESS TRANSLATION TO REDUCE MEMORY FOOTPRINT IN VIRTUALIZED ENVIRONMENTS

CROSS-REFERENCE TO RELATED APPLICATIONS

This patent application is a U.S. National Phase Application under 35 U.S.C. §371 of International Application No. PCT/US2011/067043, filed Dec. 22, 2011, entitled INDEXED PAGE ADDRESS TRANSLATION TO REDUCE MEMORY FOOTPRINT IN VIRTUALIZED ENVIRONMENTS.

FIELD OF INVENTION

The field of invention relates generally to computer memory architecture, and, more specifically, to reducing a memory footprint in a virtual environment.

BACKGROUND

Virtual machine monitors are used to manage a virtual machine's (VM) guest physical memory and backing it with real host physical memory. One way to map a guest VM's memory to a host physical memory is called "extended page tables," which is used to accelerate the translation from guest to host memory. Though the general guest physical address space layout (e.g., where pages in the memory space are mapped) is similar for each VM, for example, the lower n GB are random address memory (RAM) and the space at the top of guest physical memory is used for memory mapped input/output (IO), each VM uses its own extended page table tree because the individual guest physical to host physical mapping is different per VM. This approach can consume a fair amount of memory, which can be a costly resource (e.g., in embedded systems).

BRIEF DESCRIPTION OF THE DRAWINGS

The present invention is illustrated by way of example and not limitation in the figures of the accompanying drawings, in which like references indicate similar elements and in which:

FIG. 2 illustrates is a block diagram of a guest logical memory address according to one embodiment of the invention.

FIG. 8A is a block diagram illustrating an exemplary in-order pipeline and an exemplary register renaming, out-of-order issue/execution pipeline according to embodiments of the invention.

FIG. 8B is a block diagram illustrating an exemplary embodiment of an in-order architecture core and an exemplary register renaming, out-of-order issue/execution architecture core to be included in a processor according to embodiments of the invention.

FIG. 15 is a block diagram contrasting the use of a software instruction converter to convert binary instructions in a source instruction set to binary instructions in a target instruction set according to embodiments of the invention.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Index Page Translation

Below are embodiments of mapping a guest logical memory address to a host physical memory address using a page index, that is beneficial in reducing the memory footprint in a virtualized environment. In one embodiment, a VMM uses an index page to translate a guest logical memory address to a host physical memory address. In this embodiment, each VM has its own page index that is used to reference a corresponding guest physical memory address stored in an index page. The VMM retrieves an address of the corresponding index page by walking a set of page tables as determined by segments of a guest logical memory address. The VMM retrieves the page index for that VM, which is an offset into the index page. The entry indicated by the page index in the index page contains the guest physical memory address. This guest physical memory address is combined with a segment of the guest logical memory address to form the host physical memory address. In addition to the guest to host translation, the VMM can use the page index to assist in copy on write or assisted copy on write memory management schemes.

Figure 1:
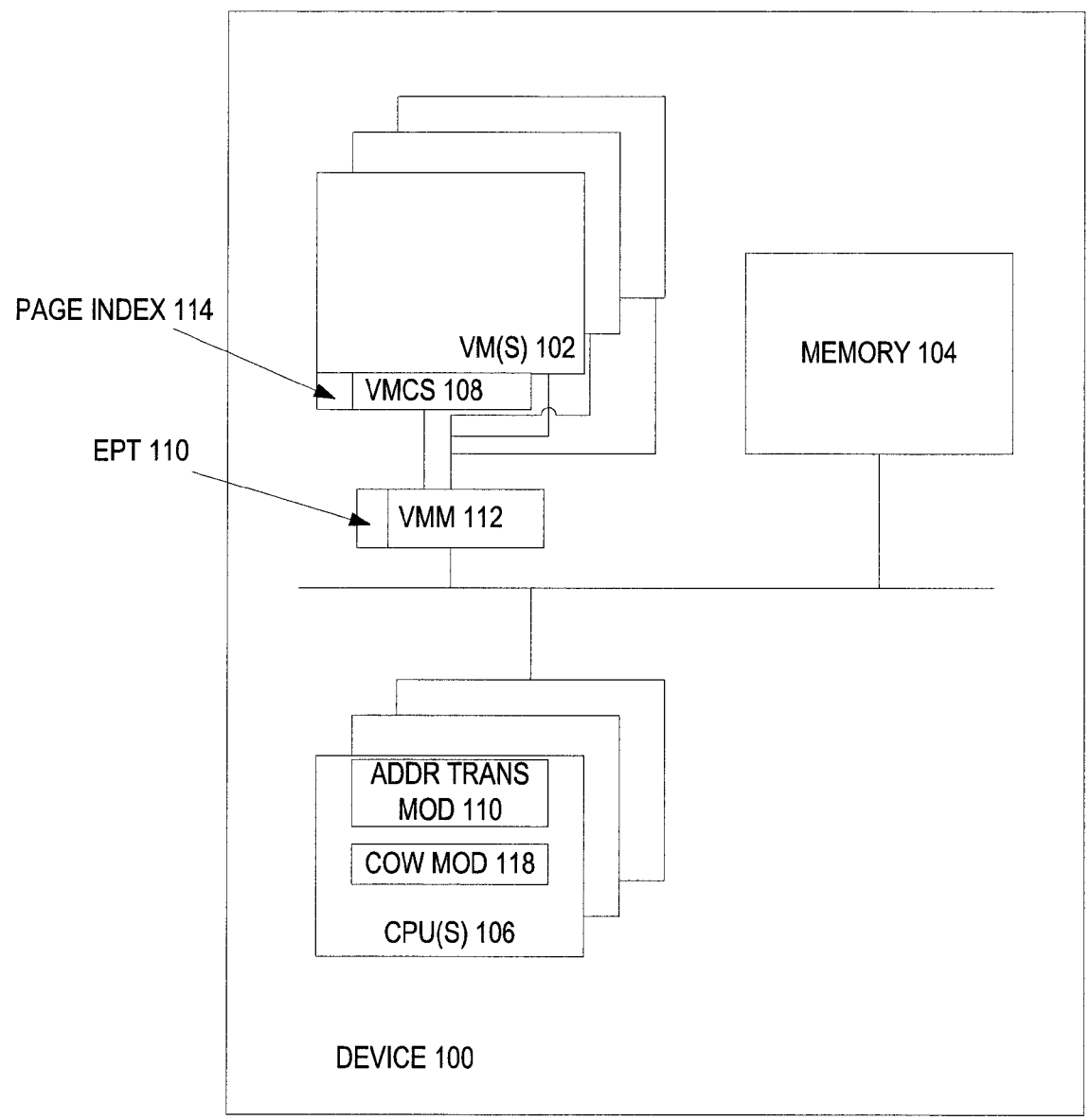
FIG. 1 illustrates a block diagram of a device with multiple virtual machines (VM) according to one embodiment of the invention.

FIG. 1 illustrates a block diagram of a device 100 with multiple virtual machines (VMs). In FIG. 1, the device 100 includes one or more virtual memory machines (VM) 102, memory 104, and one or more central processing units (CPUs) 106. In one embodiment, the device can be a type of device that is capable running one or more virtual machines (personal computer, laptop, server, embedded device, programmable logic controllers (PLC), etc. and/or any other type of device that is capable of running one or more virtual machines). In one embodiment, each of the CPUs 106 that can be a single core or a multicore processor. In one embodiment, memory 104 is physical memory (e.g., see FIG. 8 below).

In one embodiment, device 100 includes one or more VMs 102 executing on the device 100. In this embodiment, one VMM 112 controls a set of VMs 102 using an extended page table (EPT) 110 and page index 114. A VM is a software implementation of a machine (e.g. a computer) that executes programs like a physical machine. In one embodiment, a virtual machine provides a system platform, which supports the execution of an operating system (OS). If there are more than one VM, each of the VMs may run the same or different OS and this OS may be the same or different from the OS running in device 100. For example and in one embodiment, the computer may run Microsoft Windows™, whereas the VMs 102 may run the same or different OS (e.g. the same or different version of Microsoft Windows™, Apple Mac OS X™, Java OS, UNIX-based OS, etc.).

Because each of the VM(s) 102 are a separate machine running within device 100, each of the VM(s) 102 includes a virtual machine manager (VMM) 112 that is used to run concurrently on the host device 100. The VMM 112 for each VM 102 presents to the guest OS of the VM 102 a virtual operating platform and manages the execution of the guest OS. In addition, the VMM 112 manages the memory translation between the logical memory address space of the corresponding VM 102 to physical memory address space of the memory 104. In one embodiment, each of the VM(s) 102 appears to have a region of memory for the processes executing in that VM 102. In this embodiment, a process executing in a VM 102 addresses memory using a logical memory address. When the process accesses memory using the logical memory address, the VMM 112 associated with the VM 102 translates the logical memory address to a physical host memory address. In one embodiment, the physical guest memory address is a physical memory address of the VM 102 as if the VM 102 was an actual physical machine with physical memory. Because the VM 102 is a virtual machine with no physical memory, this physical guest memory address will need to be translated to a physical host memory address that is a memory address of the memory 104. In one embodiment, a guest is a VM 102 and the host is the device 100 that supports the VM 102. In one embodiment, the one or more CPUs 106 includes an address translation module 116 and the copy-on-write module 118. In one embodiment, the address translation module 116 translates the guest logical memory address to a host physical memory address. In one embodiment, the copy-on-write module 118 performs a copy-on-write.

In one embodiment, an extended page table (EPT) 110 for that VM 102 can be used to perform the translation process from the logical guest memory address to the physical host address. In this embodiment, each EPT 110 is used by the VMM to perform the translation. However, even though the general guest physical address space layout is similar for each VM, where the lower nGB are random address memory (RAM) and space at the top of guest physical memory is used for memory mapped input/output (IO), each VM will need its own extended page table tree since the individual guest physical to host physical mapping is different per VM. This approach consumes a sufficient amount of memory, which especially in embedded systems can be a costly resource.

In one embodiment, a page index 114 is used to assist in the guest logical memory address translation to host physical memory address translation and to reduce the memory requirements of the EPT 110 for each VM 102. In one embodiment, indexed page mapping is an extension to the regular EPT scheme, described above, that allows the VMM(s) 112 to use an additional index register (e.g., an entry in the VM control structure) to select one from a set of page frames per guest physical address. In one embodiment, the extended page table entry (EPTE), or for a super-page the 2 MB extended page directory entry (EPDE) or other directory entries further up in the extended page table hierarchy, does not point directly to the data page but to an additional level called an index page. Which entry in the index page the CPU choses is selected by an additional field (PGIDX) that is located in the VM's control structure (VMCS).

For example and in one embodiment, without using page indexing, a computer hosting many virtual machines builds an EPT for each virtual machine or if a non-uniform memory access (NUMA) machine with CPU local memory is to be use, one EPT per CPU per VM is needed. In these cases, the EPT tree structures may be similar and possibly identical except for a very few pages. In one embodiment, the amount of memory needed for EPT of a VM with 4 GB guest physical memory is 2050 pages (4 KB each) to hold EPT page tables. If two VMs are running on the host device, the EPT-only approach would require another set of 2050 page (4 KB each) tables or another 8 MB of memory. By using an indexed page, 1024 index pages are allocated and indexed paging in the EPTE entries is enabled and their address are set to the index page. In this embodiment, there is one EPT and index page for the virtual machines and each of up to 512 virtual machines receives one slot in the index page. The use of the page index is further described in FIGS. 3 and 4 below. While in one embodiment, each memory address is a 64-bit address, in alternate embodiments, the each memory address can be a different size (16, 32-bit addresses, etc.). Furthermore, and in one embodiment, each memory address segment can be the same or different size (e.g., 9-bit, etc.).

Figure 3:
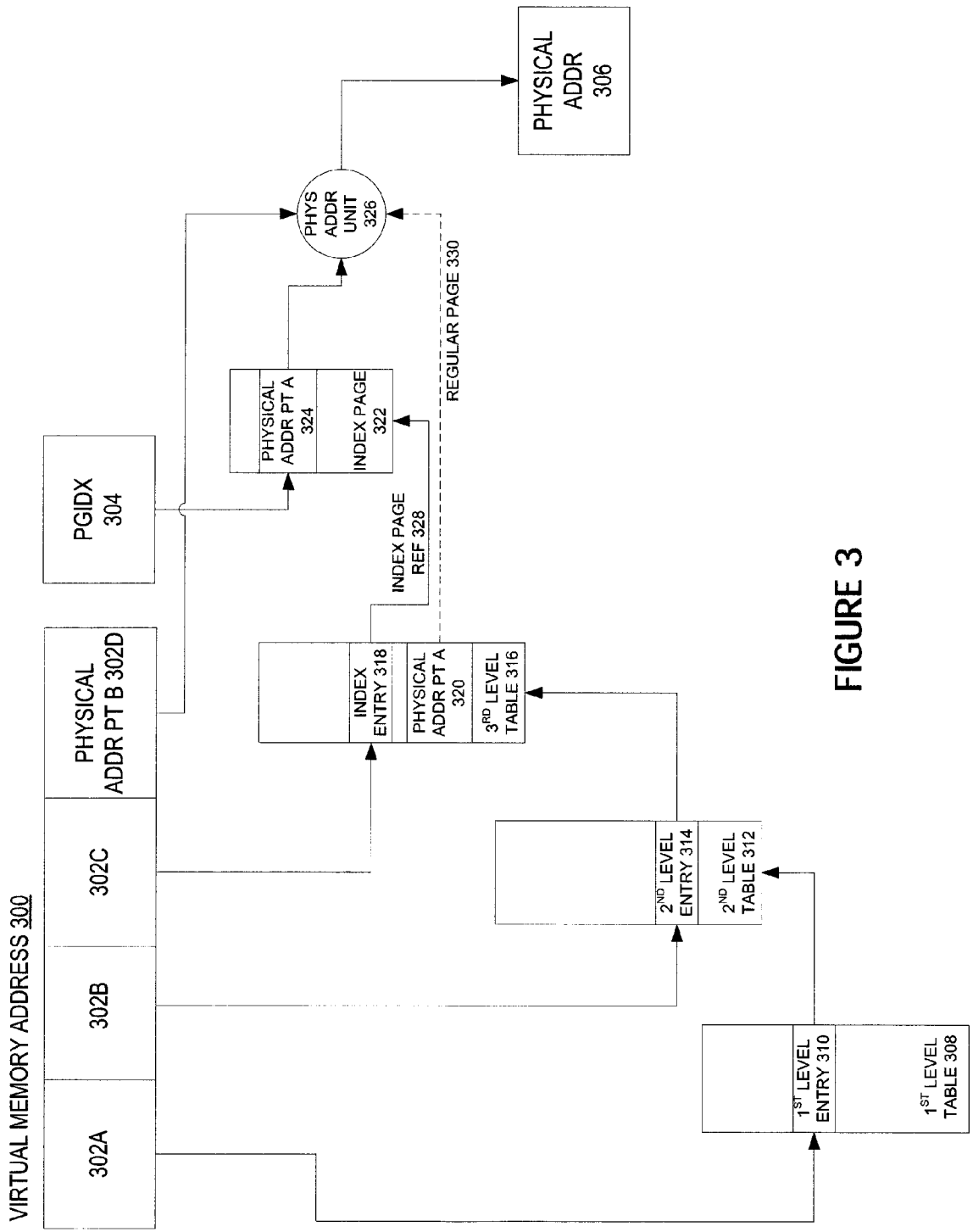
FIG. 3 illustrates a block diagram of mapping a guest logical memory address to a host physical memory address using a page index according to one embodiment of the invention.

FIG. 2 illustrates is a block diagram of a guest logical memory address 200. In one embodiment, the guest logical memory address is address at which an item (e.g., a memory cell, etc.) appears to reside from the perspective of an executing application program. In one embodiment, the guest logical memory address 200 includes memory address segments 202A-D. In one embodiment, memory address segments 202A-C are offsets into different page table that are used to derive a guest physical memory address. This derived guest physical memory address is combined with the page offset 202D. In one embodiment, embodiment, the page offset 202D is 12 bits and the other memory address segments 202A-C are 9 or 10 bits each. How the guest logical memory address is translated is further described in FIGS. 3 and 4 below. FIG. 3 illustrates a block diagram of mapping a guest logical memory address 300 to a host physical memory address 306 using a page index 304. In FIG. 3, the guest logical memory address 300 is composed of memory address segments 302A-C and page offset 302D, where memory address segments 302A-C are used as offsets into different page table and that are used to derive a guest physical memory address. In one embodiment, memory address segment 302A is an offset into $1^{st}$ level page table 308. This offset points to an entry 310 in the $1^{st}$ level page table 308 that points to a $2^{nd}$ level table 312. Memory address segment 302B is an offset into the $2^{nd}$ level page table 312 and points to the $2^{nd}$ level entry 314, which points to $3^{rd}$ level table 316.

In one embodiment, when using the EPT only based scheme, page table index 302C would point to physical address part A 320. This physical address part A 320 is combined with the remaining offset (302D) from virtual address (300). In one embodiment, the physical address unit 326 combines the two physical address part A 320 and physical address part B 302D. In one embodiment and in the EPT only scheme, there is one EPT per VM because each EPT, for each guest logical memory address, translates the multiple levels of tables down to a single entry that points to the corresponding host physical memory address.

In one embodiment, memory address segment 302C points to the index entry 318. As described above, by using an index page 322, the memory requirement for an EPT is reduced. In this embodiment, the index entry 318 is a reference to the index page 322. In one embodiment, the index page 322 is an index that allows multiple different VMs to share the same EPT. The entry that is to be used by the corresponding VM in the index page 322 is determined by the page index 304. In one embodiment, the page index 304 is an index that is unique for each VM and is stored in the VMCS corresponding to that VM. In one embodiment, there is one index page 322 for each virtual CPU. In this embodiment, the page index 304 points to an entry in the index page 322 that is used by the physical address unit 326 to produce the host physical memory address 306. For example and in one embodiment, the physical address unit 326 receives the physical address part B 302D and the physical address part A 324 from the index page 322, which is combined to generate the host physical memory address 306.

In addition to reducing the memory requirements for the guest to physical memory address translation, the memory translation using the page index scheme can additionally be used to perform a copy-on-write, assisted copy-on-write, non-VM virtual to physical memory address translations, input/output (I/O) remapping for multiple interfaces, and page table entry attribute changes. For example and in one embodiment, copy-on-write (COW) is a system technology to reduce memory consumption and postpone overhead associated with an eager copy of memory. In one embodiment, by using index paging COW-pages are mapped at the same guest-physical address and the relevant EPTEs are likely located in the same index page. In this embodiment, the number of page tables a process has to walk to find corresponding source and target entry is reduced.

In addition and in another embodiment, because this COW operation as described above may be deterministic and the actual operation is as expensive (or less) than the cost for the exception/VMEXIT handling, assisted COW would perform the copy automatically into a "pre-determined" COW page. The COW page is referenced in the index page and is used when the copy on the first write takes place. Hence, this embodiment allows software to retract the page when needed otherwise.

Figure 4:
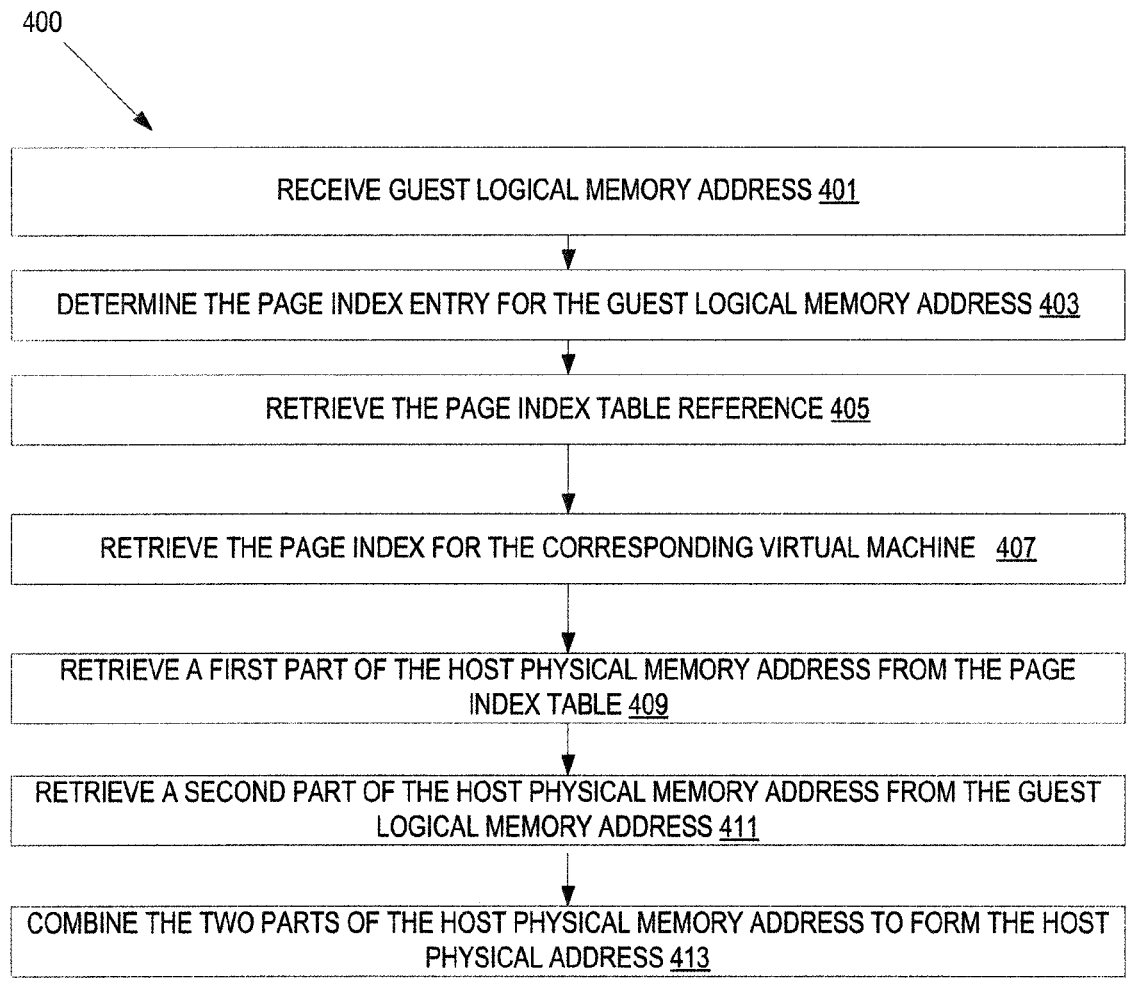
FIG. 4 illustrates an embodiment of method for mapping a virtual logical memory address to a host physical memory address using a page index.

FIG. 4 illustrates an embodiment of method 400 for mapping a virtual logical memory address to a host physical memory address using a page index. In one embodiment, a CPU, such as the one or more CPUs 106 as described in FIG. 1 above, performs method 400. In FIG. 4, method 400 begins by receiving the guest logical memory address at block 401. In one embodiment, the guest logical memory address is address at which an item (e.g., a memory cell, etc.) appears to reside from the perspective of an executing application program inside the corresponding VM. For example and in one embodiment, a guest logical memory address is the guest logical memory address 200 as described above in FIG. 2.

At block 403, method 400 determines the page index entry for the guest logical memory address. In one embodiment, method 400 retrieves the different leading memory address segments of the guest logical memory address and uses these memory address segments to walk the page tables to determine the page index entry. For example and in one embodiment, for a 64-bit guest logical memory address, method 400 walks two different page tables (308 and 312) using the first three memory address segments 302A-C as described above in FIG. 3.

Method 400 retrieves the index page reference at block 405. In one embodiment, method 400 retrieves this reference by retrieving the value that is offset by the page index entry of the $n^{th}$ level table. For example and in one embodiment, method 400 retrieves the index page reference 328 from the offset index entry 318 for the $3^{rd}$ level table 316 as described above in FIG. 3. At block 407, method 400 retrieves the page index for the virtual machine corresponding to the guest logical memory address. In one embodiment, the specific virtual machine page index value is the constant for each memory translation for a particular VM and is stored in the VMCS. Using the retrieved page index, at block 409, method 400 retrieves one part of the host physical memory address from the index page using the page index. In one embodiment, this part of the host physical memory address represents is a page offset. For example and in one embodiment, method 400 retrieves the host physical memory address (part A) 324 from the index page 322 at the entry referenced by the page index 304 as described above in FIG. 3.

At block 411, method 400 retrieves the second part of the host physical memory address from the guest logical memory address. In one embodiment, method 400 retrieves the second part of the host physical memory address from the guest logical memory address by retrieving the memory address segment 302D as described above in FIG. 3. Method 400 forms the host physical memory address by combining the first and second parts of the host physical memory address at block 413. For example and in one embodiment, method 400 uses the physical address unit 326 to combine the first 324 and second 302D parts of the host physical memory address as described in FIG. 3 above.

Figure 5:
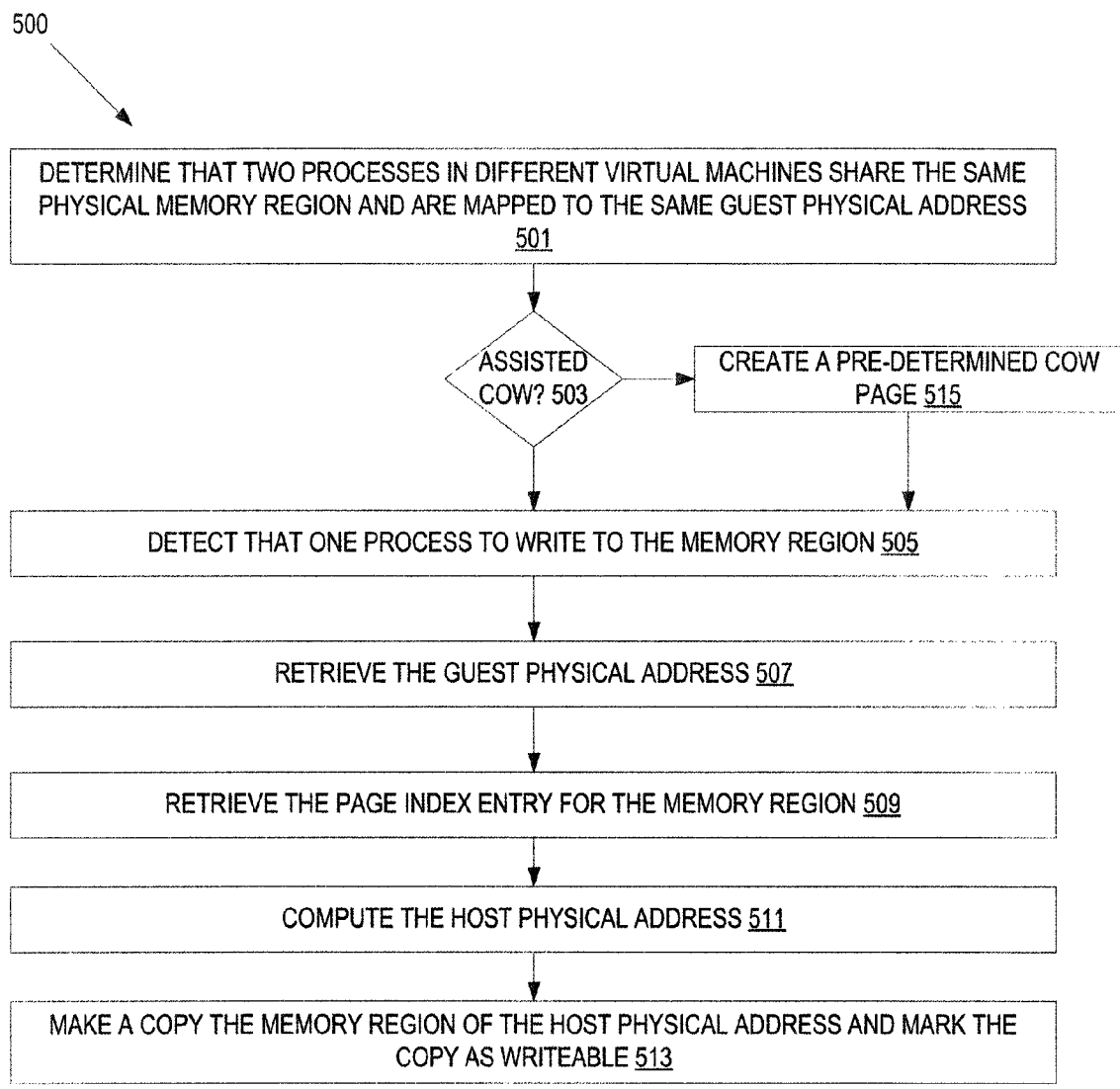
FIG. 5 illustrates an embodiment of a method for performing a copy-on-write using a page index.

As described above, the page index scheme of guest logical to host physical memory address translation can be used for copy-on-write and assisted copy-on-write applications. FIG. 5 illustrates an embodiment of a method for performing a copy-on-write or assisted copy-on-write using a page index. In one embodiment, a VMM, such as VMM 112 as described in FIG. 1 above, performs method 500. In FIG. 5, method 500 begins by determining that two processes in different VMs share the same host physical memory region and this host physical memory region is mapped to the same guest physical address at block 501. In one embodiment, if the host physical memory region is mapped to the same guest physical address, it is likely that the entries in the EPT for each VM reference the same index page.

At block 503, method 500 determines if assisted COW is being performed. Assisted COW differs from the regular COW scheme by creating a pre-determined COW page before it is needed. This can be useful when the actual COW operation is as expensive or less than as expensive as an exception/VMEXIT, so as to save the cost of a VMEXIT. If the assisted COW is being used, at block 515, method 500 creates a pre-determined COW page. Execution proceeds to block 505 below. If assisted COW is not being performed, execution proceeds to block 505 below. In one embodiment, multiple COW pages can be pre-allocated and managed in a pool. When a COW page is needed, one of the pool pages is used.

At block 505, method 500 detects that one of the processes is to write to the memory region. In one embodiment, method 500 detects that a process writes to the memory region by the memory region being marked as read-only. By trying to write to the read-only memory, an exception is raised to initiate the copy-on-write process. In response to the detection of the write to the memory region, method 500 retrieves the guest physical address for the memory region for each VM at block 507. In one embodiment, because the two processes are using a page index, one walk of the page tables is needed to determine the guest physical address for the each VM.

At block 509, method 500 retrieves the page index for each VM. In one embodiment, method 500 retrieves the page index from the VMCS for each VM. Using the retrieved page index, method 500 computes host physical memory address at block 511. In one embodiment, method 500 retrieves a part of the host physical memory address using the page index for each VM. By using the page index for each VM, one page table walk is made to get two host physical memory addresses. At block 513, method 500 makes a copy of the memory region of the host physical address, marks the copy as writeable. In one embodiment, method 500 in the VMM stores the address of the predetermined page for the copied region into the index page at the corresponding entry for that VM. In another embodiment, using the assisted COW scheme, the address of the pre-allocated page is stored into the index page at the corresponding entry for that VM by the CPU.

In one embodiment, in addition to the COW and assisted COW applications, page indexing can be used for other memory applications. For example and in one embodiment, a page indexing scheme can be applied to virtual to physical memory address translation on a host device. In this embodiment, data is copied into the pre-determined page. This example, of page indexing could be applied to handle a page-not present fault of an I/O operation.

In another example and in another embodiment, page indexing can be applied in an I/O remapping application. In this embodiment, a network card with multiple interfaces can have a page table allocated for each interface. Using the page indexing, the multiple page tables can be replaced with one page table and one index page is used for the function previously utilized by the multiple page tables.

In a further example and further embodiment, page indexing can be used to quickly change the status of page table entry attributes. Because page table indexing can reach the last level of memory referencing broadly, the page indexing scheme can switch a large view of mapping at once. This is useful for tracking of changed files (e.g. an automatic backup system), or for taking snapshots of VMs.

Figure 6:
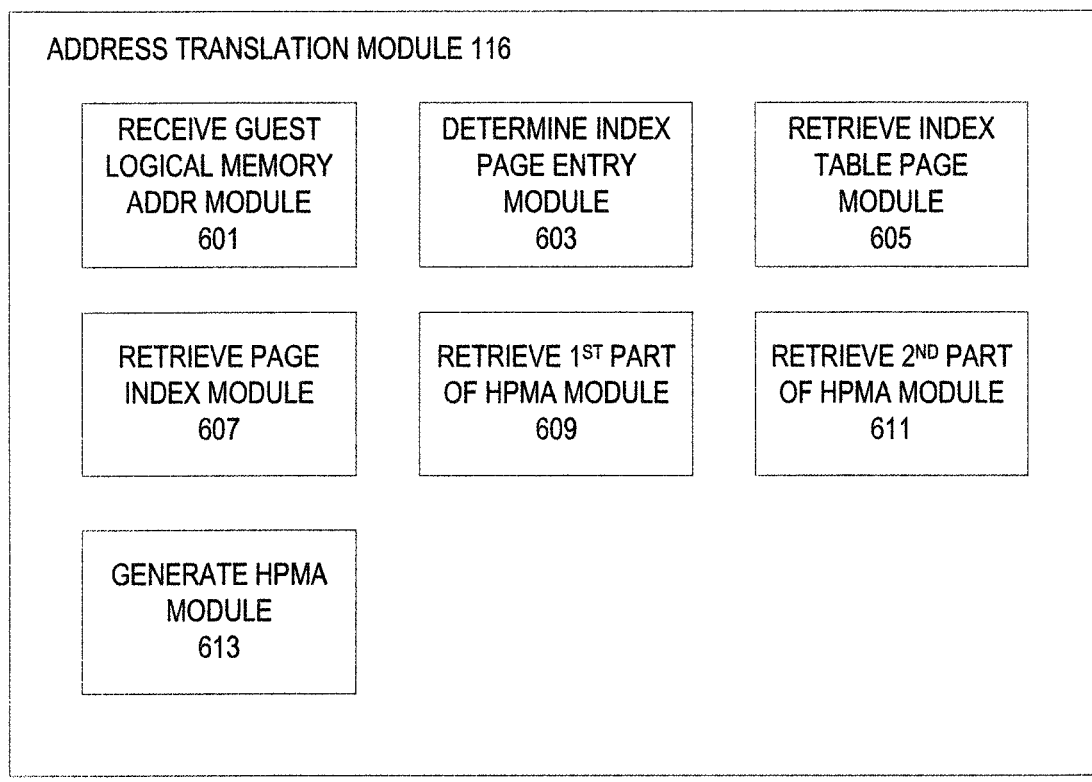
FIG. 6 illustrates a block diagram of an address translation module to map a virtual logical memory address to a host physical memory address using a page index according to one embodiment of the invention.

FIG. 6 illustrates a block diagram of a virtual memory monitor 112 to map a virtual logical memory address to a host physical memory address using a page index. In one embodiment, the address translation module 116 includes receive guest logical memory address module 601, determine index page entry module 603, retrieve index page reference module 605, retrieve page index module 607, retrieve first part of the host physical memory address module 609, retrieve second part of the host physical memory address module 611, and generate host physical memory address module 613. In one embodiment, the receive guest logical memory address module 601 receives the guest logical memory address as described in FIG. 4, block 401 above. In one embodiment, the determine index page entry module 603 index page entry as described in FIG. 4, block 403 above. In one embodiment, the retrieve page index reference module 605 retrieves the page index reference as described in FIG. 4, block 405 above. In one embodiment, the retrieve page index module 607 retrieves the page index as described in FIG. 4, block 407 above. In one embodiment, the retrieve first part of the host physical memory address module 609 retrieves the first part of the host physical memory address as described in FIG. 4, block 409 above. In one embodiment, the retrieve second part of the host physical memory address module 611 retrieves the second part of the host physical memory address as described in FIG. 4, block 411 above. In one embodiment, the generate host physical memory address module 613 generates the host physical memory address as described above in FIG. 4, block 413 above.

Figure 7:
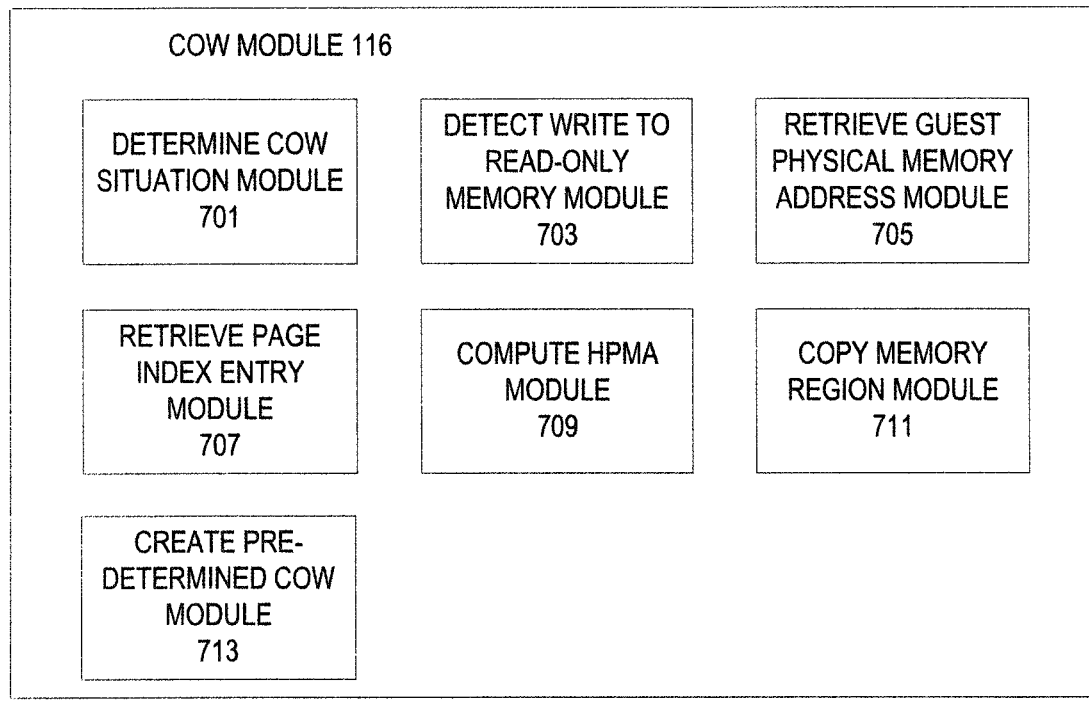
FIG. 7 illustrates a block diagram of a copy-on-write module to perform a copy-on-write using a page index according to one embodiment of the invention.

FIG. 7 illustrates a block diagram of a copy-on-write module 118 to perform a copy-on-write using a page index. In one embodiment, the copy-on-write module 118 includes determines COW situation module 701, detect write to read-only memory module 703, retrieve guest physical memory module 705, retrieve page index entry module 707, compute host physical memory address 709, copy memory region module 711, and create pre-determined COW module 713. In one embodiment, the determines COW situation module 701 determines a COW situation as described in FIG. 5, block 501 above. In one embodiment, the detect write to read-only memory module 703 detects the write to read-only memory as described in FIG. 5, block 505 above. In one embodiment, the retrieve guest physical memory address module 705 retrieves guest physical memory address as described in FIG. 5, block 507 above. In one embodiment, the retrieve page index entry module 707 retrieves the page index entry as described in FIG. 5, block 509 above. In one embodiment, the compute host physical memory address 709 computes the host physical memory address as described in FIG. 5, block 511 above. In one embodiment, the copy memory region module 711 copies the memory region as described in FIG. 5, block 513 above. In one embodiment, the create pre-determined COW module 713 creates the pre-determined COW page as described in FIG. 5, block 515 above.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures In-Order and Out-Of-Order Core Block Diagram FIG. 8A is a block diagram illustrating both an exemplary in-order pipeline and an exemplary register renaming, out-of-order issue/execution pipeline according to embodiments of the invention. FIG. 8B is a block diagram illustrating both an exemplary embodiment of an in-order architecture core and an exemplary register renaming, out-of-order issue/execution architecture core to be included in a processor according to embodiments of the invention. The solid lined boxes in FIGS. 8A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 8A, a processor pipeline 800 includes a fetch stage 802, a length decode stage 804, a decode stage 806, an allocation stage 808, a renaming stage 810, a scheduling (also known as a dispatch or issue) stage 812, a register read/memory read stage 814, an execute stage 816, a write back/memory write stage 818, an exception handling stage 822, and a commit stage 824.

FIG. 8B shows processor core 890 including a front end unit 830 coupled to an execution engine unit 850, and both are coupled to a memory unit 870. The core 890 may be a reduced instruction set computing (RISC) core, a complex instruction set computing (CISC) core, a very long instruction word (VLIW) core, or a hybrid or alternative core type. As yet another option, the core 890 may be a special-purpose core, such as, for example, a network or communication core, compression engine, coprocessor core, general purpose computing graphics processing unit (GPGPU) core, graphics core, or the like.

The front end unit 830 includes a branch prediction unit 832 coupled to an instruction cache unit 834, which is coupled to an instruction translation lookaside buffer (TLB) 836, which is coupled to an instruction fetch unit 838, which is coupled to a decode unit 840. The decode unit 840 (or decoder) may decode instructions, and generate as an output one or more micro-operations, micro-code entry points, microinstructions, other instructions, or other control signals, which are decoded from, or which otherwise reflect, or are derived from, the original instructions. The decode unit 840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 890 includes a microcode ROM or other medium that stores microcode for certain macroinstructions (e.g., in decode unit 840 or otherwise within the front end unit 830). The decode unit 840 is coupled to a rename/allocator unit 852 in the execution engine unit 850.

The execution engine unit 850 includes the rename/allocator unit 852 coupled to a retirement unit 854 and a set of one or more scheduler unit(s) 856. The scheduler unit(s) 856 represents any number of different schedulers, including reservations stations, central instruction window, etc. The scheduler unit(s) 856 is coupled to the physical register file(s) unit(s) 858. Each of the physical register file(s) units 858 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 858 comprises a vector registers unit, a write mask registers unit, and a scalar registers unit. These register units may provide architectural vector registers, vector mask registers, and general purpose registers. The physical register file(s) unit(s) 858 is overlapped by the retirement unit 854 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 854 and the physical register file(s) unit(s) 858 are coupled to the execution cluster(s) 860. The execution cluster(s) 860 includes a set of one or more execution units 862 and a set of one or more memory access units 864. The execution units 862 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 856, physical register file(s) unit(s) 858, and execution cluster(s) 860 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 864). It should also be understood that where separate pipelines are used, one or more of these pipelines may be out-of-order issue/execution and the rest in-order.

The set of memory access units 864 is coupled to the memory unit 870, which includes a data TLB unit 872 coupled to a data cache unit 874 coupled to a level 2 (L2) cache unit 876. In one exemplary embodiment, the memory access units 864 may include a load unit, a store address unit, and a store data unit, each of which is coupled to the data TLB unit 872 in the memory unit 870. The instruction cache unit 834 is further coupled to a level 2 (L2) cache unit 876 in the memory unit 870. The L2 cache unit 876 is coupled to one or more other levels of cache and eventually to a main memory.

By way of example, the exemplary register renaming, out-of-order issue/execution core architecture may implement the pipeline 800 as follows: 1) the instruction fetch 838 performs the fetch and length decoding stages 802 and 804; 2) the decode unit 840 performs the decode stage 806; 3) the rename/allocator unit 852 performs the allocation stage 808 and renaming stage 810; 4) the scheduler unit(s) 856 performs the schedule stage 812; 5) the physical register file(s) unit(s) 858 and the memory unit 870 perform the register read/memory read stage 814; the execution cluster 860 performs the execute stage 816; 6) the memory unit 870 and the physical register file(s) unit(s) 858 perform the write back/memory write stage 818; 7) various units may be involved in the exception handling stage 822; and 8) the retirement unit 854 and the physical register file(s) unit(s) 858 perform the commit stage 824.

The core 890 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 890 includes logic to support a packed data instruction set extension (e.g., AVX1, AVX2), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 834/874 and a shared L2 cache unit 876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 9B:
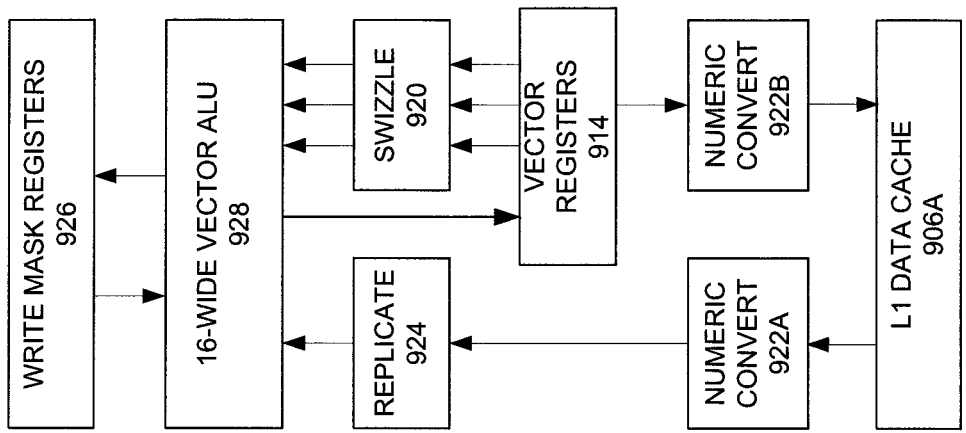
FIGS. 9A and 9B are block diagrams illustrating an exemplary in-order core architectures according to embodiments of the invention.
Figure 9A:
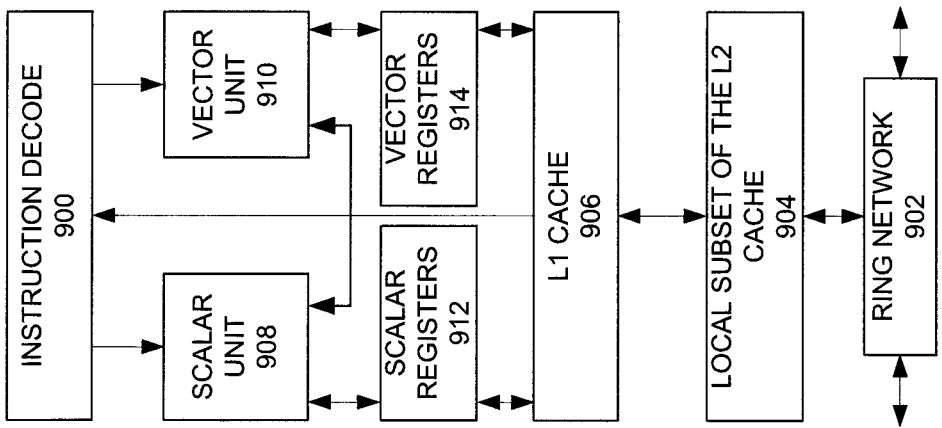

FIGS. 9A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 9A is a block diagram of a single processor core, along with its connection to the on-die interconnect network 902 and with its local subset of the Level 2 (L2) cache 904, according to embodiments of the invention. In one embodiment, an instruction decoder 900 supports the x86 instruction set with a packed data instruction set extension. An L1 cache 906 allows low-latency accesses to cache memory into the scalar and vector units. While in one embodiment (to simplify the design), a scalar unit 908 and a vector unit 910 use separate register sets (respectively, scalar registers 912 and vector registers 914) and data transferred between them is written to memory and then read back in from a level 1 (L1) cache 906, alternative embodiments of the invention may use a different approach (e.g., use a single register set or include a communication path that allow data to be transferred between the two register files without being written and read back).

The local subset of the L2 cache 904 is part of a global L2 cache that is divided into separate local subsets, one per processor core. Each processor core has a direct access path to its own local subset of the L2 cache 904. Data read by a processor core is stored in its L2 cache subset 904 and can be accessed quickly, in parallel with other processor cores accessing their own local L2 cache subsets. Data written by a processor core is stored in its own L2 cache subset 904 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 9B is an expanded view of part of the processor core in FIG. 9A according to embodiments of the invention. FIG. 9B includes an L1 data cache 906A part of the L1 cache 904, as well as more detail regarding the vector unit 910 and the vector registers 914. Specifically, the vector unit 910 is a 16-wide vector processing unit (VPU) (see the 16-wide ALU 928), which executes one or more of integer, single-precision float, and double-precision float instructions. The VPU supports swizzling the register inputs with swizzle unit 920, numeric conversion with numeric convert units 922A-B, and replication with replication unit 924 on the memory input. Write mask registers 926 allow predicating resulting vector writes.

Processor with Integrated Memory Controller and Graphics

Figure 10:
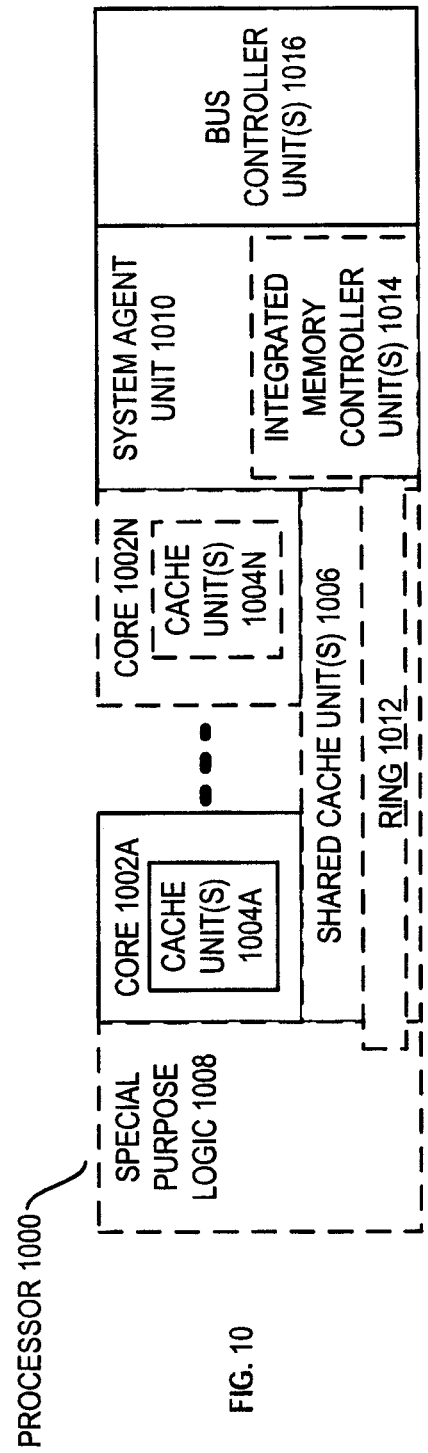
FIG. 10 is a block diagram illustrating a processor that may have more than one core according to embodiments of the invention.

FIG. 10 is a block diagram of a processor 1000 that may have more than one core, may have an integrated memory controller, and may have integrated graphics according to embodiments of the invention. The solid lined boxes in FIG. 10 illustrate a processor 1000 with a single core 1002A, a system agent 1010, a set of one or more bus controller units 1016, while the optional addition of the dashed lined boxes illustrates an alternative processor 1000 with multiple cores 1002A-N, a set of one or more integrated memory controller unit(s) 1014 in the system agent unit 1010, and special purpose logic 1008.

Thus, different implementations of the processor 1000 may include: 1) a CPU with the special purpose logic 1008 being integrated graphics and/or scientific (throughput) logic (which may include one or more cores), and the cores 1002A-N being one or more general purpose cores (e.g., general purpose in-order cores, general purpose out-of-order cores, a combination of the two); 2) a coprocessor with the cores 1002A-N being a large number of special purpose cores intended primarily for graphics and/or scientific (throughput); and 3) a coprocessor with the cores 1002A-N being a large number of general purpose in-order cores. Thus, the processor 1000 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1000 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof. While in one embodiment a ring based interconnect unit 1012 interconnects the integrated graphics logic 1008, the set of shared cache units 1006, and the system agent unit 1010/integrated memory controller unit(s) 1014, alternative embodiments may use any number of well-known techniques for interconnecting such units. In one embodiment, coherency is maintained between one or more cache units 1006 and cores 1002-A-N.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture instruction set; that is, two or more of the cores 1002A-N may be capable of execution the same instruction set, while others may be capable of executing only a subset of that instruction set or a different instruction set.

Exemplary Computer Architectures

FIGS. 11-14 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 11:
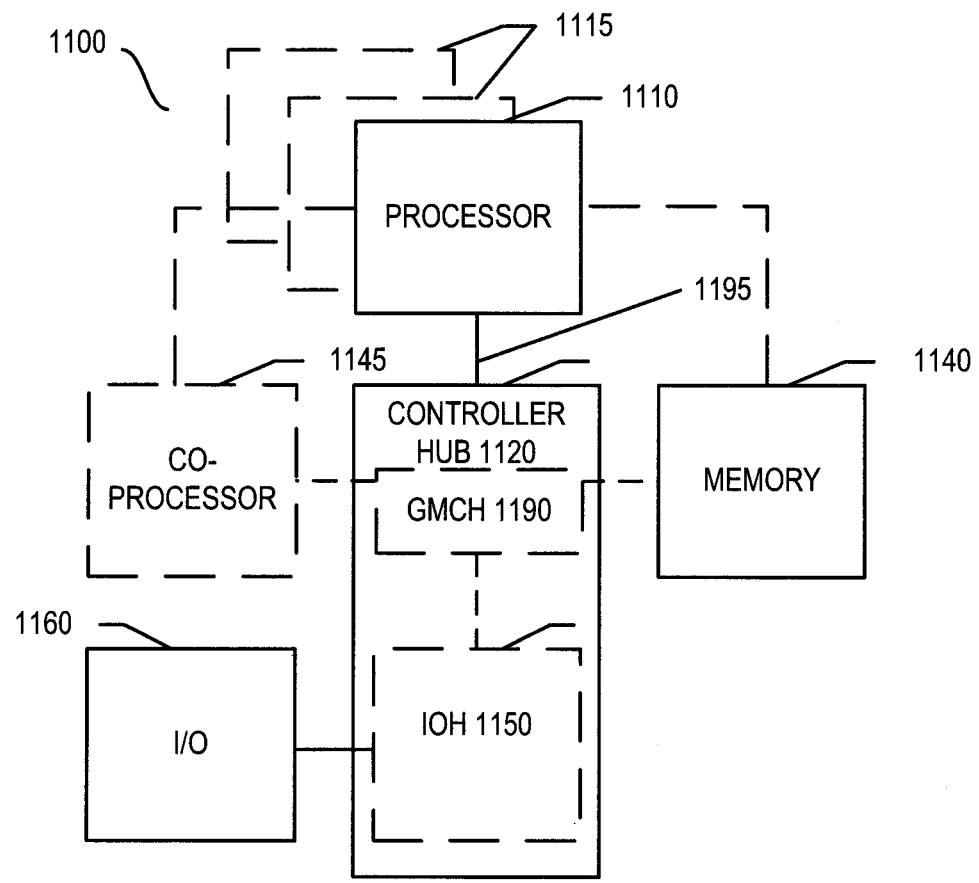
FIG. 11 is a block diagram of a system in accordance with one embodiment of the invention.

Referring now to FIG. 11, shown is a block diagram of a system 1100 in accordance with one embodiment of the present invention. The system 1100 may include one or more processors 1110, 1115, which are coupled to a controller hub 1120. In one embodiment the controller hub 1120 includes a graphics memory controller hub (GMCH) 1190 and an Input/Output Hub (IOH) 1150 (which may be on separate chips); the GMCH 1190 includes memory and graphics controllers to which are coupled memory 1140 and a coprocessor 1145; the IOH 1150 is couples input/output (I/O) devices 1160 to the GMCH 1190. Alternatively, one or both of the memory and graphics controllers are integrated within the processor (as described herein), the memory 1140 and the coprocessor 1145 are coupled directly to the processor 1110, and the controller hub 1120 in a single chip with the IOH 1150.

The optional nature of additional processors 1115 is denoted in FIG. 11 with broken lines. Each processor 1110, 1115 may include one or more of the processing cores described herein and may be some version of the processor 1000.

The memory 1140 may be, for example, dynamic random access memory (DRAM), phase change memory (PCM), or a combination of the two. For at least one embodiment, the controller hub 1120 communicates with the processor(s) 1110, 1115 via a multi-drop bus, such as a frontside bus (FSB), point-to-point interface such as QuickPath Interconnect (QPI), or similar connection 1195.

In one embodiment, the coprocessor 1145 is a special-purpose processor, such as, for example, a high-throughput MIC processor, a network or communication processor, compression engine, graphics processor, GPGPU, embedded processor, or the like. In one embodiment, controller hub 1120 may include an integrated graphics accelerator.

There can be a variety of differences between the physical resources 1110, 1115 in terms of a spectrum of metrics of merit including architectural, microarchitectural, thermal, power consumption characteristics, and the like.

In one embodiment, the processor 1110 executes instructions that control data processing operations of a general type. Embedded within the instructions may be coprocessor instructions. The processor 1110 recognizes these coprocessor instructions as being of a type that should be executed by the attached coprocessor 1145. Accordingly, the processor 1110 issues these coprocessor instructions (or control signals representing coprocessor instructions) on a coprocessor bus or other interconnect, to coprocessor 1145. Coprocessor(s) 1145 accept and execute the received coprocessor instructions.

Figure 12:
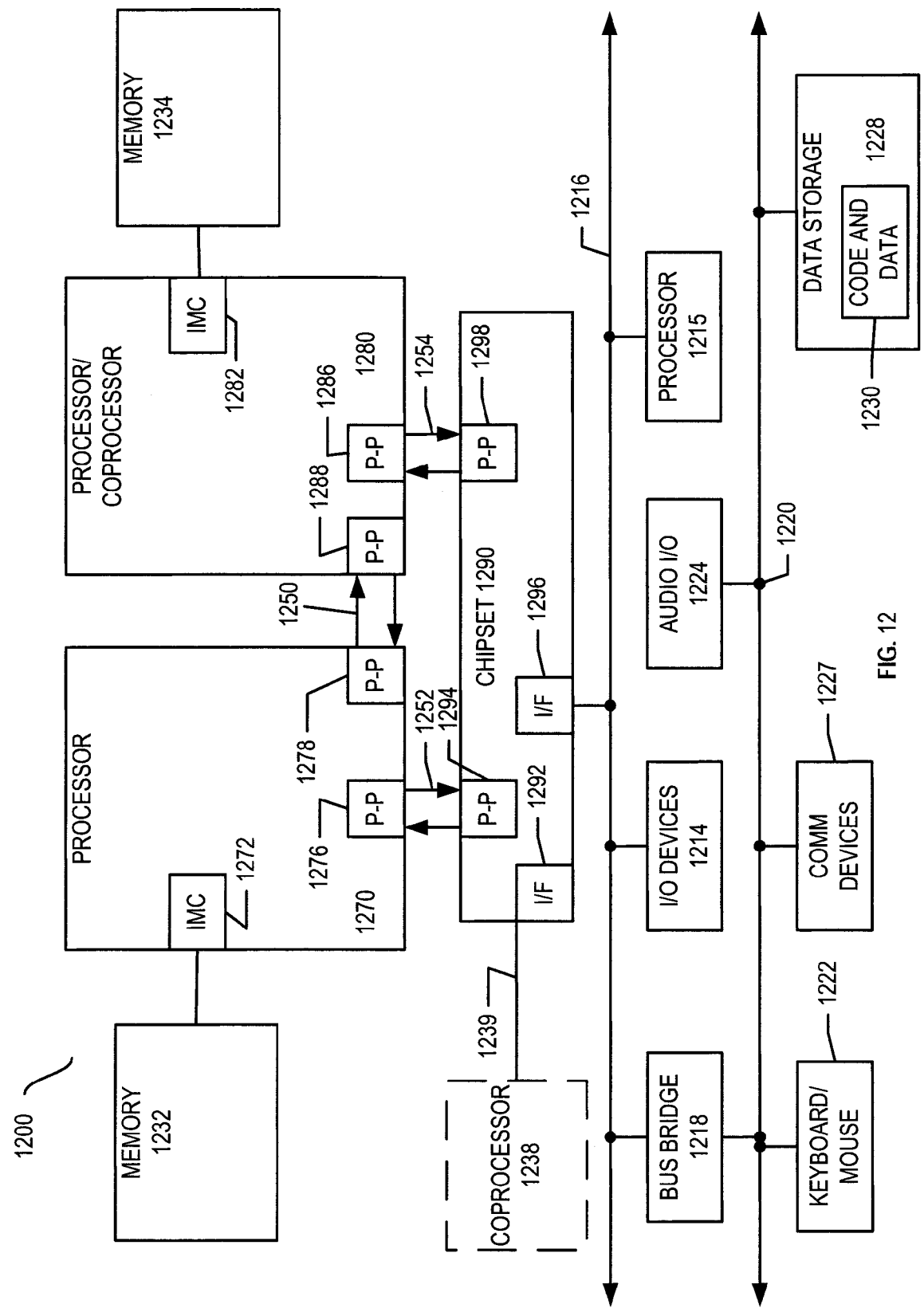
FIG. 12 is a block diagram of a second system in accordance with an embodiment of the invention.

Referring now to FIG. 12, shown is a block diagram of a first more specific exemplary system 1200 in accordance with an embodiment of the present invention. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of the processor 1000. In one embodiment of the invention, processors 1270 and 1280 are respectively processors 1110 and 1115, while coprocessor 1238 is coprocessor 1145. In another embodiment, processors 1270 and 1280 are respectively processor 1110 coprocessor 1145.

Processors 1270 and 1280 are shown including integrated memory controller (IMC) units 1272 and 1282, respectively. Processor 1270 also includes as part of its bus controller units point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 may each exchange information with a chipset 1290 via individual P-P interfaces 1252, 1254 using point to point interface circuits 1276, 1294, 1286, 1298. Chipset 1290 may optionally exchange information with the coprocessor 1238 via a high-performance interface 1239. In one embodiment, the coprocessor 1238 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present invention is not so limited.

As shown in FIG. 12, various I/O devices 1214 may be coupled to first bus 1216, along with a bus bridge 1218 which couples first bus 1216 to a second bus 1220. In one embodiment, one or more additional processor(s) 1215, such as coprocessors, high-throughput MIC processors, GPGPU's, accelerators (such as, e.g., graphics accelerators or digital signal processing (DSP) units), field programmable gate arrays, or any other processor, are coupled to first bus 1216. In one embodiment, second bus 1220 may be a low pin count (LPC) bus. Various devices may be coupled to a second bus 1220 including, for example, a keyboard and/or mouse 1222, communication devices 1227 and a storage unit 1228 such as a disk drive or other mass storage device which may include instructions/code and data 1230, in one embodiment. Further, an audio I/O 1224 may be coupled to the second bus 1220. Note that other architectures are possible. For example, instead of the point-to-point architecture of FIG. 12, a system may implement a multi-drop bus or other such architecture.

Figure 13:
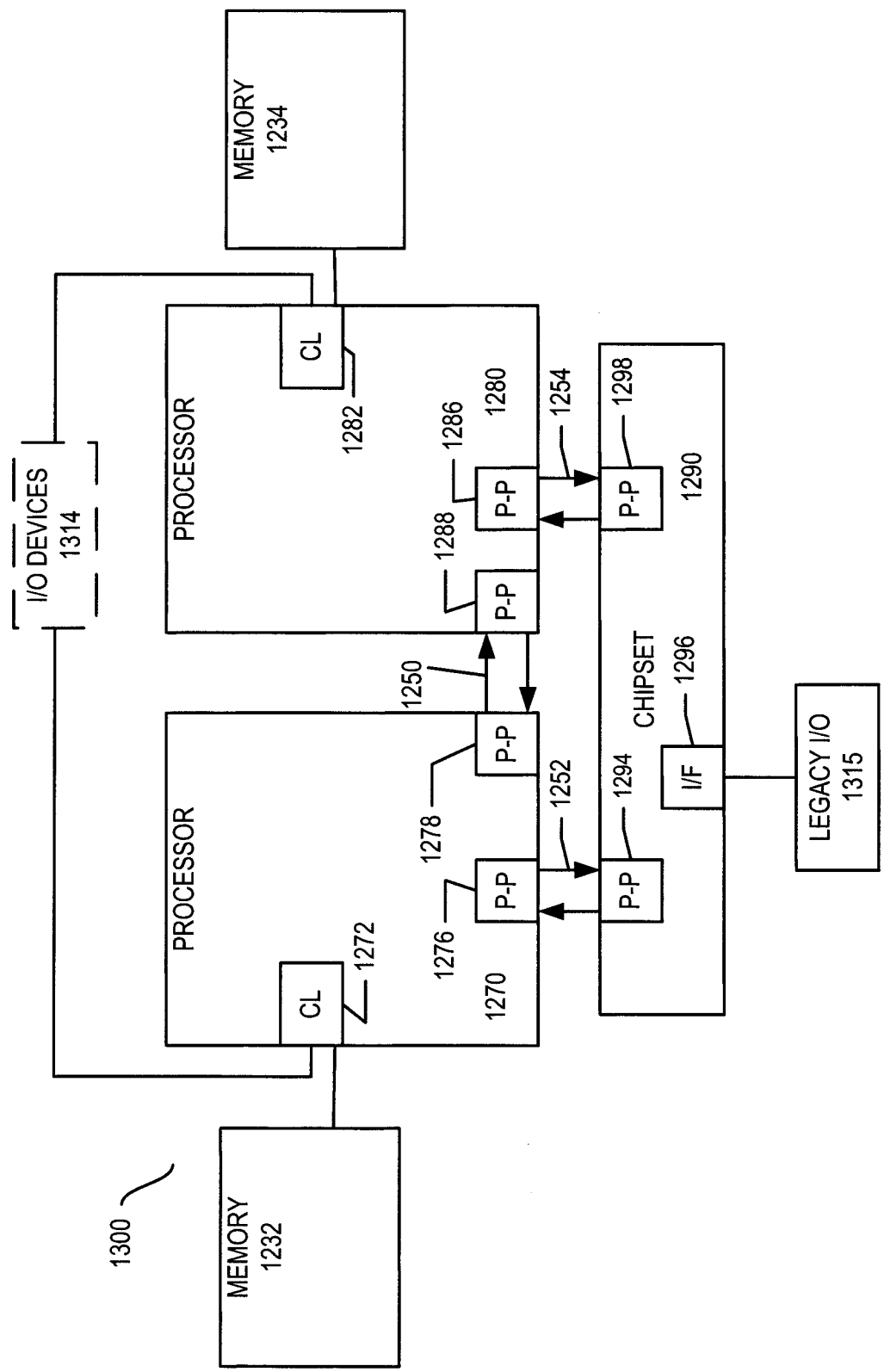
FIG. 13 is a block diagram of a third system in accordance with an embodiment of the invention.

Referring now to FIG. 13, shown is a block diagram of a second more specific exemplary system 1300 in accordance with an embodiment of the present invention. Like elements in FIGS. 12 and 13 bear like reference numerals, and certain aspects of FIG. 12 have been omitted from FIG. 13 in order to avoid obscuring other aspects of FIG. 13.

FIG. 13 illustrates that the processors 1270, 1280 may include integrated memory and I/O control logic ("CL") 1272 and 1282, respectively. Thus, the CL 1272, 1282 include integrated memory controller units and include I/O control logic. FIG. 13 illustrates that not only are the memories 1232, 1234 coupled to the CL 1272, 1282, but also that I/O devices 1314 are also coupled to the control logic 1272, 1282. Legacy I/O devices 1315 are coupled to the chipset 1290.

Figure 14:
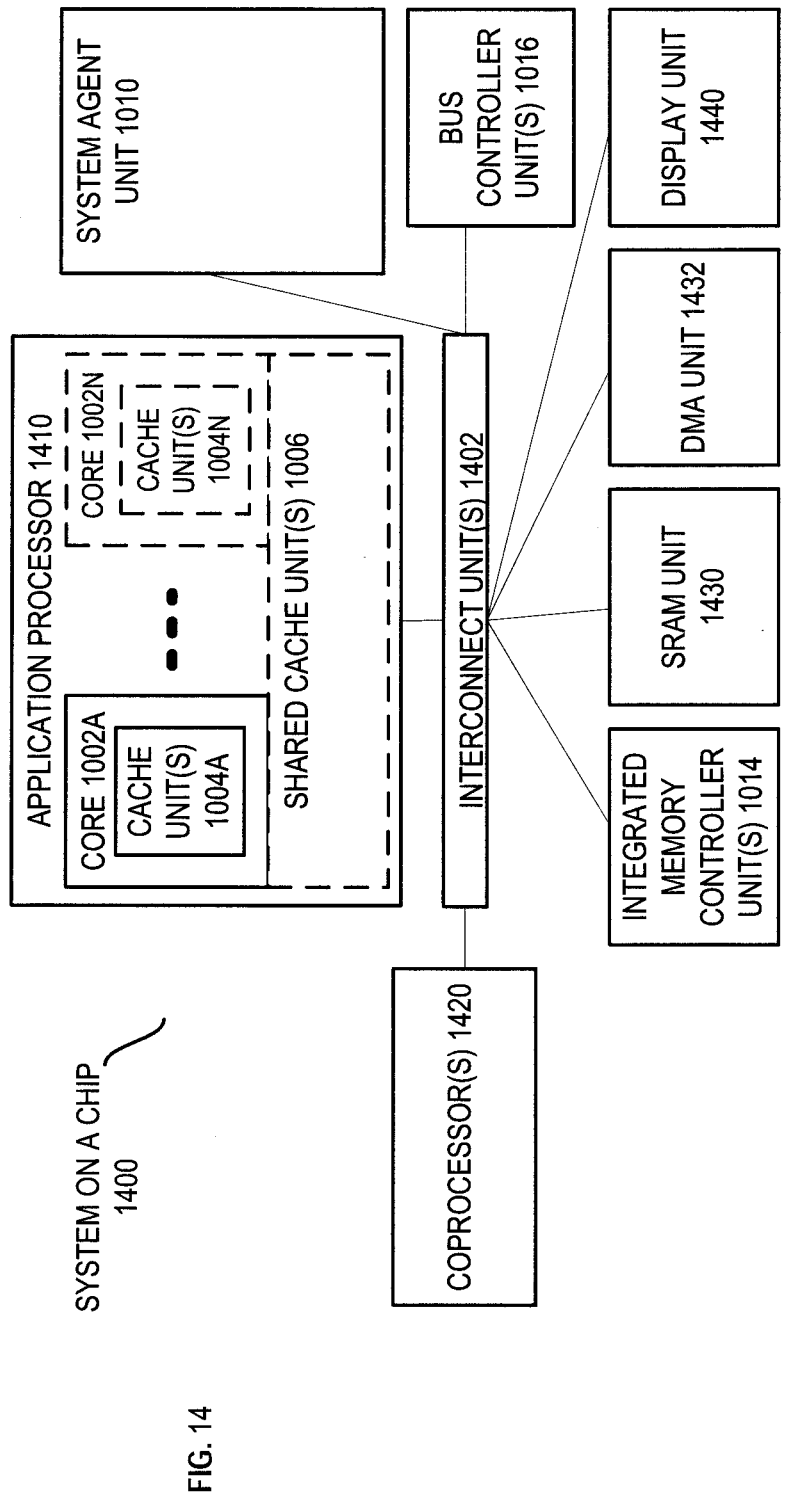
FIG. 14 is a block diagram of a SoC in accordance with an embodiment of the invention.

Referring now to FIG. 14, shown is a block diagram of a SoC 1400 in accordance with an embodiment of the present invention. Similar elements in FIG. 10 bear like reference numerals. Also, dashed lined boxes are optional features on more advanced SoCs. In FIG. 14, an interconnect unit(s) 1402 is coupled to: an application processor 1410 which includes a set of one or more cores 202A-N and shared cache unit(s) 1006; a system agent unit 1010; a bus controller unit(s) 1016; an integrated memory controller unit(s) 1014; a set or one or more coprocessors 1420 which may include integrated graphics logic, an image processor, an audio processor, and a video processor; an static random access memory (SRAM) unit 1430; a direct memory access (DMA) unit 1432; and a display unit 1440 for coupling to one or more external displays. In one embodiment, the coprocessor(s) 1420 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1230 illustrated in FIG. 12, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 15 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 15 shows a program in a high level language 1502 may be compiled using an x86 compiler 1504 to generate x86 binary code 1506 that may be natively executed by a processor with at least one x86 instruction set core 1516. The processor with at least one x86 instruction set core 1516 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1504 represents a compiler that is operable to generate x86 binary code 1506 (e.g., object code) that can, with or without additional linkage processing, be executed on the processor with at least one x86 instruction set core 1516. Similarly, FIG. 15 shows the program in the high level language 1502 may be compiled using an alternative instruction set compiler 1508 to generate alternative instruction set binary code 1510 that may be natively executed by a processor without at least one x86 instruction set core 1514 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1512 is used to convert the x86 binary code 1506 into code that may be natively executed by the processor without an x86 instruction set core 1514. This converted code is not likely to be the same as the alternative instruction set binary code 1510 because an instruction converter capable of this is difficult to make; however, the converted code will accomplish the general operation and be made up of instructions from the alternative instruction set. Thus, the instruction converter 1512 represents software, firmware, hardware, or a combination thereof that, through emulation, simulation or any other process, allows a processor or other electronic device that does not have an x86 instruction set processor or core to execute the x86 binary code 1506.

Alternative Embodiments

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate embodiments of the invention. The scope of the invention is not to be determined by the specific examples provided above but only by the claims below.

What is claimed is:

1. A method of converting a memory address, comprising:
   receiving a guest logical memory address for a virtual machine;
   determining an index page reference from the guest logical memory address, wherein an index page allows a plurality of virtual machines to share an extended page table;
   retrieving a page index corresponding to the virtual machine from a virtual machine control structure of the virtual machine;
   retrieving a first part of the host physical memory address from an index page identified by the index page reference using the page index;
   retrieving a second part of the host physical memory address from the guest logical memory address; and
   generating the host physical memory address from the first and second parts of the host physical memory address.

2. The method of claim 1, wherein the page index is constant for the virtual machine.

3. The method of claim 1, wherein the determining the index page reference comprises:
   walking a set of one or more page tables to arrive at an entry of one of the set of one or more page tables that includes the page index reference.

4. The method of claim 3, wherein the walking is based on one or more offsets that are part of the guest logical memory address.

5. The method of claim 3, wherein the page table is a table that is used to translate the guest logical memory address to a guest physical memory address.

6. The method of claim 1, wherein the guest logical memory address and host physical memory address are 64-bit addresses.

7. The method of claim 6, wherein the guest logical memory address includes four 9-bit memory address segments which are used in the determining of the a index page reference and the remaining 12-bit memory address segment is the second part of the host physical memory address.

8. The method of claim 1, wherein the virtual machine is a virtual system that is running on a host.

9. The method of claim 1, wherein the generating comprises:
   combining the first and second parts of the host physical memory address to form the host physical memory address.

10. A device, comprising:
    a receive guest logical memory address module configured to receive the guest logical memory address;
    a determine index page entry module adapted to determine an index page reference from the guest logical memory address, wherein an index page allows a plurality of virtual machines to share an extended page table;
    a retrieve index page module adapted to retrieve a page index corresponding to the virtual machine from a virtual machine control structure of the virtual machine;
    a retrieve first part of the host physical memory address module adapted to retrieve a first part of the host physical memory address from an index page using the page index identified by the index page reference;
    a retrieve second part of the host physical memory address module adapted to retrieve a second part of the host physical memory address from the guest logical memory address; and
    a generate host physical memory address module adapted to generate the host physical memory address from the first and second parts of the host physical memory address.

11. The device of claim 10, wherein the page index is constant for the virtual machine.

12. The device of claim 10, wherein the determine index page entry module is further configured to walk a set of one or more page tables to arrive at an entry of one of the set of one or more page tables that includes the page index reference.

13. The device of claim 12, wherein the walk is based on one or more offsets that are part of the guest logical memory address.

14. The device of claim 12, wherein the page table is a table that is used by the virtual machine monitor to translate the guest logical memory address to a guest physical memory address.

15. The device of claim 10, wherein the guest logical memory address and host physical memory address are 64-bit addresses.

16. The device of claim 15, wherein the guest logical memory address includes four 9-bit memory address segments which are used in the determining the a index page reference and the remaining 12-bit memory address segment is the second part of the host physical memory address.

17. The device of claim 10, wherein the virtual machine is a virtual system that is running on the host.

18. A non-transitory machine-readable medium having executable instructions to perform a method to convert a memory address, the method comprising:
    receiving a guest logical memory address for a virtual machine;

determining an index page reference from the guest logical memory address, wherein an index page allows a plurality of virtual machines to share an extended page table;

retrieving a page index corresponding to the virtual machine from a virtual machine control structure of the virtual machine;

retrieving a first part of the host physical memory address from an index page identified by the index page reference using the page index;

retrieving a second part of the host physical memory address from the guest logical memory address; and generating the host physical memory address from the first and second parts of the host physical memory address.

* * * * *